Oct. 9, 1962 T. H. KERRY 3,057,582
IMPROVED ENGINE MOUNTING
Filed May 12, 1960
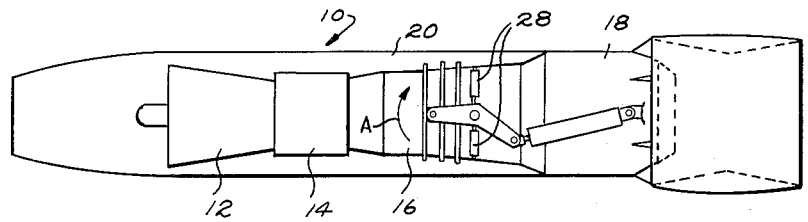
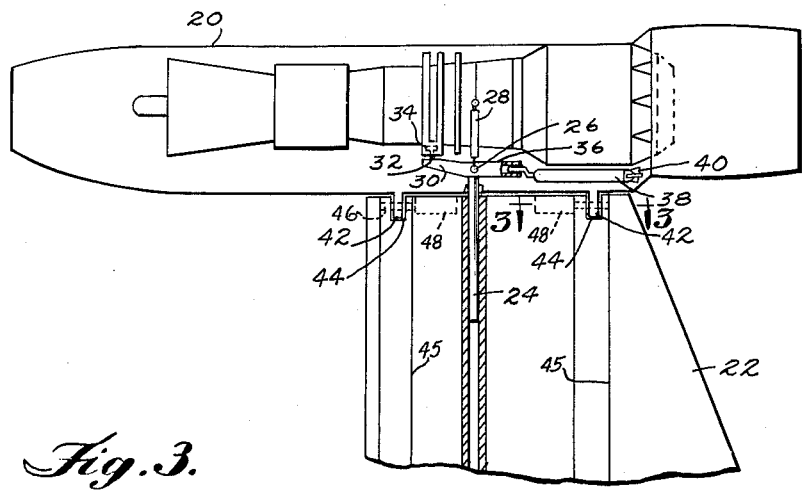
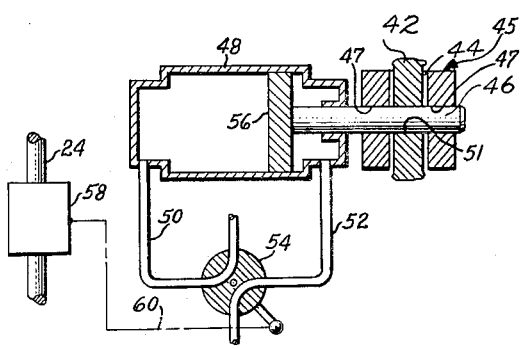
INVENTOR
THOMAS HENRY KERRY
BY Cushman, Darby + Cushman
ATTORNEYS

United States Patent Office 3,057,582
Patented Oct. 9, 1962

3,057,582
IMPROVED ENGINE MOUNTING
Thomas Henry Kerry, Derby, England, assignor to Rolls-Royce Limited, Derby, England
Filed May 12, 1960, Ser. No. 28,596
Claims priority, application Great Britain May 12, 1959
6 Claims. (Cl. 244—56)

This invention relates to aircraft which are adapted so that they can take-off and land in a vertical direction by employing jet propulsion gas turbine engines which can be positioned to provide thrust for vertical take-off or landing or thrust for forward flight.

Such engines are mounted for rotation about an axis at right angles to their longitudinal axis whereby they can be positioned so that their propulsive gases can be directed either vertically or horizontally.

According to this invention a jet propulsion gas turbine engine mounted for rotation about an axis at right angles to its longitudinal axis is adapted to be retained in a horizontal position relative to an aircraft by inter-engaging locking members on the aircraft and engine respectively which are spaced from the axis of rotation of the engine, whereby during flight aerodynamic loads are transmitted through said inter-engaging locking members to the aircraft structure, means being provided for selectively engaging and disengaging the locking members.

The means for moving the locking means out of engagement with the load bearing members is preferably connected with the means for causing rotation of the engine at right angles to its longitudinal axis the arrangement being such that when the means for rotating the engine are actuated the locking members are disengaged.

In order that the invention can be clearly understood and readily carried into effect, one engine support in accordance with the invention will now be particularly described, by way of example only, with reference to the accompanying drawings, in which:

FIGURE 1 is a plan view showing a gas turbine jet propulsion engine mounted on the tip of an aircraft wing, and disposed in a position to provide forward thrust, and FIGURE 2 is a side view of the engine shown in FIGURE 1.

FIGURE 3 is an enlarged sectional view partly in elevation and taken substantially on the line 3—3 of FIGURE 1, the view also illustrating diagrammatically the rotating means for the nacelle and its interconnection to the locking means.

Referring to the drawings, 10 indicates a jet propulsion gas turbine engine having compressor equipment 12, combustion equipment 14, turbine equipment 16 for rotating the compressor 12 and a propelling nozzle 18.

The engine is disposed within a nacelle 20 and is supported on the other end of an aircraft wing 22 by a rotatable shaft 24 which forms part of a mechanism, not shown, for rotating the engine and the nacelle about the axis of the shaft 24, which is arranged at right angles to the longitudinal axis of the engine.

The means for rotating the shaft 24 may be of any convenient kind and form no part of the invention.

A bell crank lever 26 is mounted on the shaft 24 for rotation therewith and two diametrically opposed struts 28 are connected between the bell crank lever and the casing of the engine to support the engine on the shaft 24.

One arm 30 of the bell crank lever 26 supports a stub shaft 32 which carries on its end a freely rotatable roller 34, the roller 34 being disposed in a recess in the engine casing, whilst the other arm 36 of the bell crank lever 26 has one end of a link 38 connected to it, the other end of the link 38 is connected to a pivot member 40 fixed to the nacelle 20.

Thus when the shaft 24 is rotated in the direction of arrow A in FIGURE 2, the engine will also be rotated until it attains a position in which its longitudinal axis is disposed in a vertical position.

Movement of the engine beyond the vertical position whilst the shaft is being rotated in the direction of arrow A is prevented by the link 38 which is also arranged to prevent movement of the engine beyond the horizontal position when the shaft 24 is being rotated in the opposite direction.

In order that the engine shall be rigidly supported during normal forward flight of an aircraft in which it is mounted, locking means are provided on the nacelle 20 and the wing 22 which are adapted to engage with each other when the engine is disposed in a horizontal position, as shown in the drawings.

The locking means comprise two structural members or lugs 42, which depend from the nacelle 20 and are arranged in diametrically opposed positions on opposite sides of the shaft 24, which are positioned so as to engage in a pair of slots 44 in the wing tip 22.

In more detail, the slots 44 are formed in the ends of structural members or spars 45 of the wing structure 22. Each of the spars 45 has a pair of axially aligned holes or apertures 47 (FIGURE 3) adjacent its end, the axially aligned holes 47 having an axis which extends transversely across the slot 44. Suitably supported on each spar 45 is a double-acting hydraulic cylinder 48 having a piston 56 and an axially movable locking pin 46 carried thereby. The axially movable locking pin is arranged to move through the holes 47 in the end of the spar 45 and across the slot 44 or be withdrawn so as to clear the slot 44.

Each pin 46 is moved to the position in which it engages with and clears the slot 44 by actuation of the double-acting hydraulic cylinder 48. The double-acting hydraulic cylinder 48 is supplied with hydraulic fluid through the pipes 50, 52. The pipes 50 and 52 are each connected to one end of the cylinder 48 and can be selectively connected to a suitable source of hydraulic fluid or to exhaust by means of a valve 54. The valve 54 is constructed so that when one of the pipes 50 or 52 is connected to the hydraulic fluid supply, the other is connected to the exhaust.

Thus by appropriately positioning the valve 54, the piston 56 within the cylinder 48 can be moved so that the pin 46 engages with or disengages with the hole in the lug 42.

When the engine is in the position shown in the drawings, the lugs 42 are engaged in the slots 44 and the pins 46 extend across the slot and pass through holes 51 in the lugs 42, whereby the engine is held rigidly in position.

When it is necessary to rotate the engine 10 into a vertical position from the position shown in the drawings, the hydraulic cylinders 48 are actuated to withdraw the pins 46 from the slots 44, and therefore from the holes 47 and 51 whereby the engine is then free for rotation.

The means 58 for rotating the shaft 24 are then actuated whereby the engine is rotated into a vertical position suitable for either vertical take-off or landing.

When the engine is returned to the horizontal position the lugs 42 engage in the slots 44 and when the holes in the lugs 42 are in line with the pins 46 the pins are urged through the hole whereby the engine and the nacelle are locked in the horizontal position.

A connecting means diagrammatically illustrated at 60 in FIGURE 3 is provided between the means 58 and the valve 54. The connecting means 60 is so arranged that when the shaft rotating means 58 is actuated, the valve 54 is moved to a position where the hydraulic cylinder 48 withdraws the pins 46 from the slots 44 before rotation of the engine nacelle can be effected.

When the above described locking arrangement for the engine and nacelle are employed aerodynamic loads which develop in the nacelle during normal forward flight are transmitted through the lugs 42 to the wing 22.

It will be understood, that whilst the invention has been described with reference to one wing and engine of an aircraft that the other wing will also be provided with an engine at its tip which will be rotated and locked in position in the manner previously described.

It will also be understood that the engine need not be mounted on the tip of the wing of an aircraft but could equally well be supported in some other part of the aircraft structure.

What I claim is:

1. In an aircraft having a wing structure and at least one nacelle carrying a jet propulsion gas turbine engine and mounted on said wing structure for rotation about an axis at right angles to its longitudinal axis between horizontal and vertical positions, the improvement in means for locking the nacelle in a horizontal position against rotation in either direction about its axis of rotation comprising: at least a pair of structural members respectively positioned on said nacelle and said wing structure and spaced from the axis of rotation of said nacelle, said members each having apertures therein adapted to align with one another when said nacelle is in a horizontal position; means cooperating with said members when the apertures thereof are in alignment with each other for insertion therethrough to lock said members together, said last-mentioned means when locking said members together causing aerodynamic loads produced during flight on said nacelle to be transferred through said pair of members to said wing structure regardless of the direction of said aerodynamic loads and means for causing rotation of the nacelle about its axis of rotation, said locking means being interconnected with said rotating means.

2. The aircraft of claim 1 including a second pair of structural members respectively positioned on said nacelle and said wing structure, said second pair of members being spaced from the axis of rotation of said nacelle and disposed on a diametrically opposite side of the axis of rotation of said nacelle with respect to said first pair of members, said second pair of members having apertures therethrough adapted to be aligned with one another when said nacelle is in horizontal position, and wherein said locking means includes means to lock said second pair of members together for transferring aerodynamic loads from said nacelle to said wing structure.

3. In an aircraft having a wing structure and at least one nacelle carrying a jet turbine engine and mounted on said wing structure for rotation about an axis at right angles to its longitudinal axis between horizontal and vertical positions, the improvements in means for locking the nacelle in a horizontal position against rotation in either direction about its axis of rotation comprising: a lug member having a hole therethrough, said lug member being fixedly secured to said nacelle at a point spaced from its axis of rotation, a spar in said wing structure and having a slot therein for receiving said lug member when said nacelle is in horizontal position, said spar having a hole therein with an axis intersecting the slot and coinciding with the axis of the hole in said lug member when said lug member is in said slot, a pin member carried by the wing structure and movable through the hole in said spar into and out of engagement with the hole in said lug, said pin member when in engagement with said lug causing locking of said nacelle in a horizontal position whereby aerodynamic loads on said nacelle tending to rotate the same about its axis of rotation in either direction are transferred from the nacelle to the spar means to selectively move said pin member in the hole in said spar into and out of engagement with the hole in said lug, and means to rotate said nacelle between horizontal and vertical position, said last-mentioned rotating means including means interconnected with said pin operating means to cause said pin member to be disengaged from the hole in said lug before rotation of the nacelle can be effected.

4. The aircraft of claim 3 including a second lug member fixedly carried by the nacelle and disposed on a diametrically opposite side of the axis of rotation of said nacelle with respect to said first lug member, said second lug member having a hole therethrough, a second spar in said wing structure and having a slot therein arranged to receive said second lug member when the nacelle is in a horizontal position, said second spar having a hole therein with an axis intersecting said slot and arranged to coincide with the axis of the hole in said lug when the lug is disposed in said slot, and a second pin member carried by said wing structure and movable in the hole in said second spar into and out of engagement with the hole in said second lug, said second pin member being movable by said pin operating means.

5. In an aircraft having a wing structure and at least one nacelle carrying a jet propulsion gas turbine engine and mounted on said wing structure for rotation about an axis at right angles to its longitudinal axis between horizontal and vertical positions, the improvements in means for locking the nacelle in a horizontal position against rotation in either direction about its axis of rotation comprising: a lug member having a hole therethrough, said lug member being fixedly secured to said nacelle at a point spaced from the axis of rotation of the nacelle; a pin member carried by said wing structure and movable into and out of engagement with the hole in said lug, said pin member when in engagement with said lug causing locking of said nacelle in a horizontal position whereby aerodynamic loads on said nacelle tending to rotate the same about its axis of rotation in either direction are transferred from said nacelle to said wing structure; means to selectively move said pin member into and out of engagement with said lug; and means to rotate said nacelle between horizontal and vertical position, said last-mentioned rotating means being interconnected with said pin operating means to cause said pin member to be disengaged from said lug before rotation of the nacelle can be effected.

6. The aircraft of claim 5 wherein said pin operating means includes a double acting hydraulic cylinder.

References Cited in the file of this patent

UNITED STATES PATENTS

| | | |
|---|---|---|
| 1,623,613 | Arndt | Apr. 5, 1927 |
| 2,544,830 | Grill et al. | Mar. 13, 1951 |
| 2,719,682 | Handel | Oct. 4, 1955 |
| 2,926,868 | Taylor | Mar. 1, 1960 |
| 2,961,189 | Doak | Nov. 22, 1960 |